Feb. 11, 1930.  T. G. McCANN  1,746,666
COMBINED TEMPERATURE AND PRESSURE CONTROL
Filed March 22, 1926
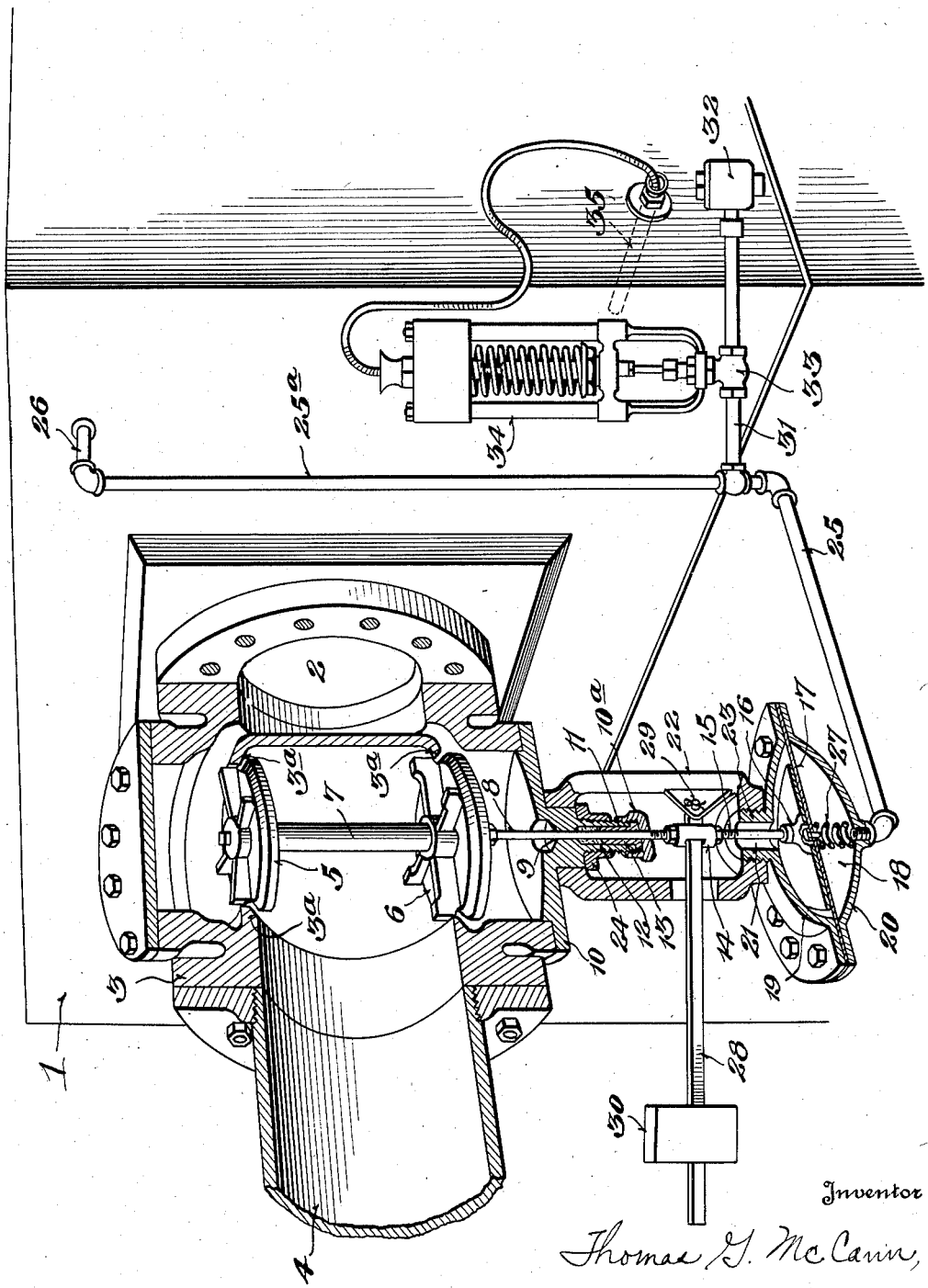
Inventor
Thomas G. McCann,
By Mauro, Cameron, Lewis & Markam
Attorneys Patented Feb. 11, 1930

1,746,666

UNITED STATES PATENT OFFICE

THOMAS GROVER McCANN, OF CARRICK, PENNSYLVANIA, ASSIGNOR, BY MESNE ASSIGNMENTS, TO THE FULTON SYLPHON COMPANY, OF KNOXVILLE, TENNESSEE, A CORPORATION OF DELAWARE

COMBINED TEMPERATURE AND PRESSURE CONTROL

Application filed March 22, 1926. Serial No. 96,614.

This invention relates to combined pressure and temperature regulators.

In many instances, as for example in the operation of feed water heaters, it is desirable to limit the pressure within such devices to predetermined values owing to structural requirements, and it is also desirable to limit the temperature of the liquid being heated to a predetermined value. For example, in feed water heaters the pressure must be limited to a few pounds but will normally not be less than atmospheric pressure, which corresponds to steam at a temperature of 212° F., whereas it may be desirable to limit the temperature of the liquid to 180° F.

In installations of this character it has heretofore been customary to provide a valve of a suitable type for controlling the supply of the heating medium, together with means for automatically controlling the valve. In such installations the size of the valve employed is dependent on the quantity of said heating medium, as steam, required. In large installations, the size and weight of the moving parts are often such as to make it impractical to employ thermostatic controls of the usual size and type, and even in installations of moderate size the type of automatic control heretofore used is not entirely satisfactory because it is uncertain in operation and does not possess the required degree of sensitiveness.

One object of the present invention is to provide a combined pressure and temperature regulator wherein the size and type of thermostat employed is entirely independent of the quantity of heating medium required, and of the size of the moving parts.

A further object is to provide a novel device of this character which is simple and economical to manufacture and which possesses a high degree of accuracy and sensitiveness.

The invention will be readily understood by referring to the accompanying drawing which illustrates one embodiment of the invention but it is to be expressly understood that the invention is not limited to the illustrated embodiment, reference being had to the appended claims for a definition of the invention.

The structure constituting the subject matter of the present invention comprises a suitable valve or other suitable controlling means operatively connected to pressure responsive means such as a diaphragm, and means whereby the pressure on said diaphragm may be regulated in accordance with both the pressure and the temperature in the device to be controlled. The pressure and temperature control means are adapted to function independently or their action may be simultaneous and combined.

By way of example, the invention has been illustrated in combination with a receptacle 1, such as a feed water heater, having an opening 2 in the wall thereof for the admission of a suitable heating medium. Suitably connected to said receptacle at the opening 2, is a valve housing 3 having at its other side a connection with a supply conduit 4. When steam is used as a heating medium, a balanced piston valve is preferably employed as a reducing valve and as here shown, comprises the valve disks 5 and 6 connected by the valve stem 7 and adapted to engage the valve seats $3^a$ formed in the valve housing 3. Attached to the lower valve disk 6 is a rod 8 which extends downwardly through an opening 9 in the lower valve bonnet 10. Said valve bonnet is preferably provided with a central boss 11 surrounding the rod 8 and provided with an interior cavity 12 in which is inserted a gland 13 held in place by a nut $10^a$. The lower end of the rod 8 is attached to a suitable yoke member 14. To the lower end of said yoke member is attached a rod 15 which extends downwardly and is suitably connected at its lower end by means of a member 16 with a diaphragm 17 that is clamped between the flanges of upper and lower housing members 19 and 20. A chamber 18, which is in communication with receptacle 1 as will be more fully pointed out hereafter, is formed by the diaphragm and housing member 20. The upper housing member 19 is provided with an aperture 21 for the passage of the rod 15.

Suitable means are provided for attaching the diaphragm and its housing to the valve casing comprising, in the form shown, a frame 22 having threaded engagement at its lower end with a boss 23 formed on the housing member 19 and surrounding at its upper end the boss 11 of the valve bonnet 10. Said frame may be held in place by means of a nut 24 having threaded engagement with said boss 11.

A pipe 25 communicates at one end with the diaphragm chamber 18, and at its opposite end extends through an opening 26 in the wall of the receptacle 1 above the water line. By means of this connection the pressure within the receptacle 1 is transmitted to the diaphragm 17 tending to force the latter upward, and to engage the valve disks 5 and 6 with the valve seats 3ª. Resilient means, such as a spring 27, may be provided in order to counterbalance the weight of the moving parts. As shown, the spring is interposed between diaphragm 17 and housing member 20.

Inu order to ensure that the reducing valve 5, 6 will close at a predetermined pressure, suitable means are provided for counteracting the effect of the pressure on diaphragm 17 up to an adjustable, predetermined amount. In the form shown, these means include a lever 28, extending through the yoke member 14 and being movable therewith, said lever being shown as pivoted to the frame 22 at 29. An adjustable weight 30 is provided on the other end of said lever, whereby the pressure at which the diaphragm 17 will operate to close the reducing valve may be adjusted to any desired predetermined value.

It will be seen that the pipe 25 forms a dead end connection to the pressure space of the receptacle 1. In operation, the heating medium, such as steam, will enter and condense in the pipe 25, forming therein a liquid column which will exert a hydrostatic pressure on the diaphragm 17, and which will at the same time transmit the pressure within the receptacle 1 to said diaphragm.

Suitable means are provided for controlling the hydrostatic pressure exerted on diaphragm 17 by the liquid column in accordance with the temperature of the liquid in the receptacle 1. These means preferably include a drain pipe 31 connected at one end to the vertical portion 25ª of the pipe 25 near the lower end of the latter. The opposite end of pipe 31 is fitted with a thermostatic steam trap 32, of any suitable construction such as known in the art, which may communicate with any suitable waste pipe and is adapted to allow the passage of water but to close when steam is admitted thereto. Interposed in the pipe 31 is a suitable valve 33 for controlling the flow of the fluid therethrough. Said valve is operated by means of a thermostatic control device 34 of any suitable construction, such as disclosed in the patent to Fulton, No. 1,102,035, dated June 30, 1914, and having its thermostatic bulb 35 positioned in the fluid within the receptacle 1. The thermostat is adapted to move the valve 33 toward closed position when the temperature of the fluid surrounding bulb 35 increases. The height of the vertical portion 25ª of the pipe 25 is preferably such that when completely filled with liquid, the hydrostatic pressure on the diaphragm 17 will be greater than the predetermined limit of pressure in the receptacle 1.

Assume that there is no steam pressure on conduit 4, that the temperature of the fluid in receptacle 1 is less than that desired, and that reducing valve 5, 6, valve 33, and steam trap 32 are open and it is desired to place the apparatus in operation. When steam is admitted through the conduit 4 to the receptacle 1, a portion of said steam will enter the pipe 25, and the diaphragm chamber 18. In accordance with the adjustment of weight 30, the reducing valve will remain open until the pressure increases beyond a predetermined point, when the diaphragm 17 will operate to close valve 5, 6 cutting off the supply of steam. The pressure within the receptacle 1 is thus maintained within the desired limits, and steam will gradually condense in the pipe 25, filling the lower horizontal portion and the pipe 31. As long as the valve 33 remains open the height of the liquid column will not increase beyond the level of pipe 31 since the water is constantly drained off through the steam trap 32. As the temperature of the fluid in receptacle 1 increases, the thermostat 34 will gradually close the valve 33. As soon as the rate of flow of the condensate through valve 33 becomes less than the rate of condensation in the vertical portion of pipe 25, the height of the column will begin to increase, thereby increasing the hydrostatic pressure on diaphragm 17 with a corresponding tendency to close the reducing valve. If the temperature now continues to increase, the valve 33 will be entirely closed and the height of the column in the vertical portion of pipe 25 will rapidly increase until the hydrostatic pressure reaches a value greater than that determined by the setting of the adjustable weight 30, when the reducing valve 5, 6 will be completely closed. The temperature in receptacle 1 will now decrease, thereby opening the valve 33 and allowing some of the liquid column to drain off through the trap 32, thereby again opening reducing valve 5, 6.

It will be seen that within the predetermined limit of pressure, the reducing valve will remain open, and that if such pressure increases beyond this limit, the valve will be closed independently of the temperature control. On the other hand, as long as the pressure remains within this limit, there is provided a very sensitive and accurate control of the amount of steam admitted in accordance with the temperature of the liquid being heated. The thermostatic control is entirely independent of the quantity of steam required, of the size and weight of the moving parts of the valve, etc. Therefore a much smaller thermostatic unit can be employed than would be required to operate the reducing valve directly. At the same time the motion of the reducing valve will be both gradual and extremely sensitive. In operation, a condition approaching equilibrium between the various parts will be continually maintained, and the temperature will be maintained practically constant.

While only one embodiment of the invention has been illustrated in the accompanying drawing, it is to be understood that the invention is not limited thereto but is capable of a variety of expressions, some of which will now readily suggest themselves to those skilled in the art, and changes may be made in the details and arrangement of parts without departing from the spirit of the invention. Reference is therefore to be had to the appended claims for a definition of the limits of this invention.

What is claimed is:

1. Apparatus of the class described adapted to be associated with a receptacle and including a valve for controlling the supply of a heating medium thereto, a pressure responsive diaphragm for actuating said valve and always subjected to the pressure in said receptacle, and thermosensitive means for controlling the pressure on said diaphragm in accordance with the temperature within said receptacle.

2. A combined pressure and temperature regulator adapted to be associated with a receptacle and including a valve for controlling the supply of a heating medium thereto, pressure responsive means operatively connected to said valve and adapted to be connected with the pressure space of said receptacle, and means for predeterminately increasing the pressure on said means in accordance with the temperature within said receptacle.

3. A combined pressure and temperature regulator adapted to be associated with a receptacle and including a valve for controlling the supply of a heating medium thereto, pressure responsive means for actuating said valve, means for connecting said means and said receptacle, said connecting means adapted to contain a hydrostatic column, and means for controlling the height of said hydrostatic column in accordance with the temperature within said receptacle.

4. A combined temperature and pressure regulator adapted to be associated with a receptacle and including a valve for controlling the supply of a heating medium thereto, pressure responsive means for actuating said valve, means for connecting said means and the pressure space of said receptacle, and thermostatically controlled means operatively secured to said connecting means for varying the pressure in said connecting means in accordance with the temperature in said receptacle.

5. A combined temperature and pressure regulator adapted to be associated with a receptacle and including a valve for controlling the supply of a heating medium thereto, pressure responsive means operatively connected to said valve, a conduit for connecting said means with said receptacle, said conduit being adapted to contain a hydrostatic column, and thermostatic means connected with said conduit for controlling the height of said column.

6. A combined pressure and temperature regulator adapted to be associated with a receptacle and including a valve for controlling the supply of a heating medium thereto, pressure responsive means for actuating said valve, a conduit for connecting said means with the pressure space of said receptacle, said conduit adapted to contain a hydrostatic column, and means including a thermostatically operated valve connected to said conduit for controlling the height of said column.

7. A combined temperature and pressure regulator adapted to be associated with a receptacle and including a valve for controlling the supply of a heating medium thereto, pressure responsive means for actuating said valve, a conduit for connecting said means with said receptacle, said conduit adapted to contain a hydrostatic column subjected to the pressure within said receptacle, a drain connected to said conduit near the lower portion of said column, and a thermostatically operated valve in said drain for controlling the height of said column.

8. A combined pressure and temperature regulator adapted to be associated with a receptacle and including a valve for controlling the supply of a heating medium thereto, means normally maintaining said valve in open position, pressure responsive means adapted to oppose the action of said first-named means, a conduit for connecting said pressure responsive means with said receptacle, said conduit adapted to constitute a condenser and contain a hydrostatic column, and means responsive to the temperature within said receptacle for controlling the height of said hydrostatic column.

9. A combined temperature and pressure regulator adapted to be associated with a receptacle and including a valve for controlling the supply of a heating medium thereto, means normally maintaining said valve in open position, a pressure responsive diaphragm adapted to oppose said first-named means and adapted to be connected with said receptacle, and thermosensitive means including a member projecting into said receptacle and subjected directly to the temperature within said receptacle for predeterminately increasing the pressure on said diaphragm in accordance with the temperature within said receptacle.

10. A combined pressure and temperature regulator adapted to be associated with a receptacle and including a valve for controlling the supply of a heating medium thereto, means normally maintaining said valve in open position, pressure responsive means adapted to oppose the action of said first-named means, means for connecting said receptacle and said pressure responsive means, said connecting means being adapted to provide a hydrostatic head on said pressure responsive means, and means responsive to the temperature in said receptacle for controlling the height of said hydrostatic head.

11. A combined temperature and pressure regulator adapted to be associated with a receptacle and including a valve for controlling the supply of a heating medium thereto, means normally maintaining said valve in open position, pressure responsive means adapted to oppose the action of said first-named means, a conduit for connecting said pressure responsive means with the pressure space of said receptacle, said conduit adapted to contain a hydrostatic column, and a thermostat subjected to the liquid in said receptacle for controlling the height of said column.

12. A combined pressure and temperature regulator adapted to be associated with a receptacle and including a valve for controlling the supply of a heating medium thereto, a weighted lever normally maintaining said valve in open position, pressure responsive means adapted to oppose the action of said lever, a conduit adapted to contain a hydrostatic column and to connect said means with the upper part of said receptacle, a drain connected to said conduit near the lower portion thereof, and a thermostatically operated valve in said drain for controlling the height of said column.

13. A combined pressure and temperature regulator adapted to be associated with a receptacle and including a valve for controlling the supply of a heating medium thereto, a weighted lever normally maintaining said valve in open position, a pressure responsive diaphragm operatively connected to said valve, a conduit for connecting said diaphragm with the upper part of said receptacle, said conduit adapted to contain a hydrostatic column, a drain connected to said conduit near the lower portion thereof, a valve in said drain, thermostatic means for actuating said valve and including a thermostatic element subjected to the temperature within said receptacle, and means adjacent the free end of said drain for closing the latter to the passage of said heating medium.

14. In combination with a receptacle wherein the temperature and pressure are to be controlled having a supply conduit and a valve therein, a pressure responsive diaphragm actuating said valve, means connecting said pressure responsive diaphragm with said receptacle whereby the pressure within the latter is transmitted to said pressure responsive diaphragm, and means for predeterminately increasing said pressure in accordance with the temperature within said receptacle.

15. In combination with a receptacle, means for controlling the flow of a medium thereto in accordance with the temperature and pressure in said receptacle comprising a supply conduit, a valve in said conduit, pressure responsive means for actuating said valve and always subjected to the pressure in said receptacle, and thermosensitive means for regulating the pressure on said means in accordance with the temperature in said receptacle.

16. In combination with a receptacle wherein the temperature and pressure are to be controlled and a valve for controlling the supply of a medium thereto, a pressure actuated diaphragm operatively connected to said valve, means for transmitting pressure from said receptacle to said diaphragm including means wherein a hydrostatic column may form, and means for varying the height of said column.

17. In combination with a receptacle wherein the temperature and pressure are to be controlled and a valve for controlling the supply of a heating medium thereto, a pressure responsive diaphragm operatively connected to said valve, a conduit connecting said diaphragm with the pressure space of said receptacle, said conduit being adapted to contain a hydrostatic column, a drain connected to said conduit near the lower portion thereof, a thermostatically controlled valve in said drain for regulating the height of said column, and a thermostatic steam trap adjacent the free end of said drain for closing the latter to the passage of steam.

In testimony whereof I have signed this specification.

THOMAS GROVER McCANN.